US009942059B2

(12) United States Patent
Tomisawa et al.

(10) Patent No.: US 9,942,059 B2
(45) Date of Patent: Apr. 10, 2018

(54) WIRELESS COMMUNICATION SYSTEM, WIRELESS CONTROL METHOD, AND VIRTUAL BASE STATION APPARATUS

(71) Applicant: Panasonic Intellectual Property Corporation of America, Torrance, CA (US)

(72) Inventors: Yuji Tomisawa, Kanagawa (JP); Naganori Shirakata, Kanagawa (JP); Hiroyuki Motozuka, Kanagawa (JP); Masataka Irie, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/448,098

(22) Filed: Mar. 2, 2017

(65) Prior Publication Data

US 2017/0272275 A1   Sep. 21, 2017

(30) Foreign Application Priority Data

Mar. 16, 2016  (JP) ................................ 2016-052637

(51) Int. Cl.
| | |
|---|---|
| H04B 7/06 | (2006.01) |
| H04L 12/46 | (2006.01) |
| H04W 24/02 | (2009.01) |
| H04L 29/06 | (2006.01) |
| H04W 72/00 | (2009.01) |

(52) U.S. Cl.
CPC ....... *H04L 12/4666* (2013.01); *H04B 7/0617* (2013.01); *H04B 7/0632* (2013.01); *H04L 69/28* (2013.01); *H04W 24/02* (2013.01); *H04W 72/005* (2013.01)

(58) Field of Classification Search
None
See application file for complete search history.

(56) References Cited

U.S. PATENT DOCUMENTS

2013/0053079 A1* 2/2013 Kwun ............... H04B 7/024
                                                                 455/509
2013/0065622 A1* 3/2013 Hwang ............. H04W 16/28
                                                                 455/500

OTHER PUBLICATIONS

IEEE Computer Society, "Part 11:Wireless LAN Medium Access Control (MAC) and Physical Layer (PHY) Specifications Amendment 3: Enhancements for Very High Throughput in the 60 GHz Band", IEEE Std 802.11ad(TM), Dec. 28, 2012, pp. 278-314.

* cited by examiner

*Primary Examiner* — Alejandro Rivero
(74) *Attorney, Agent, or Firm* — Seed IP Law Group LLP

(57) ABSTRACT

A virtual base station apparatus includes: a first base station apparatus and a second base station apparatus. The first base station apparatus includes a first receiver that receives a plurality of first training frames, a first transmitter that transmits a plurality of second training frames to a terminal apparatus, and a calculator that calculates a first reception quality of each of the plurality of first training frames. The terminal apparatus includes a second transmitter that transmits the plurality of first training frames to the plurality of base station apparatuses, and a second receiver that receives the plurality of second training frames. The first receiver receives a second reception quality of each of the plurality of first training frames from the second base station apparatus. The first reception quality is transmitted to the second base station apparatus when the first reception quality is higher than the second reception quality.

9 Claims, 8 Drawing Sheets

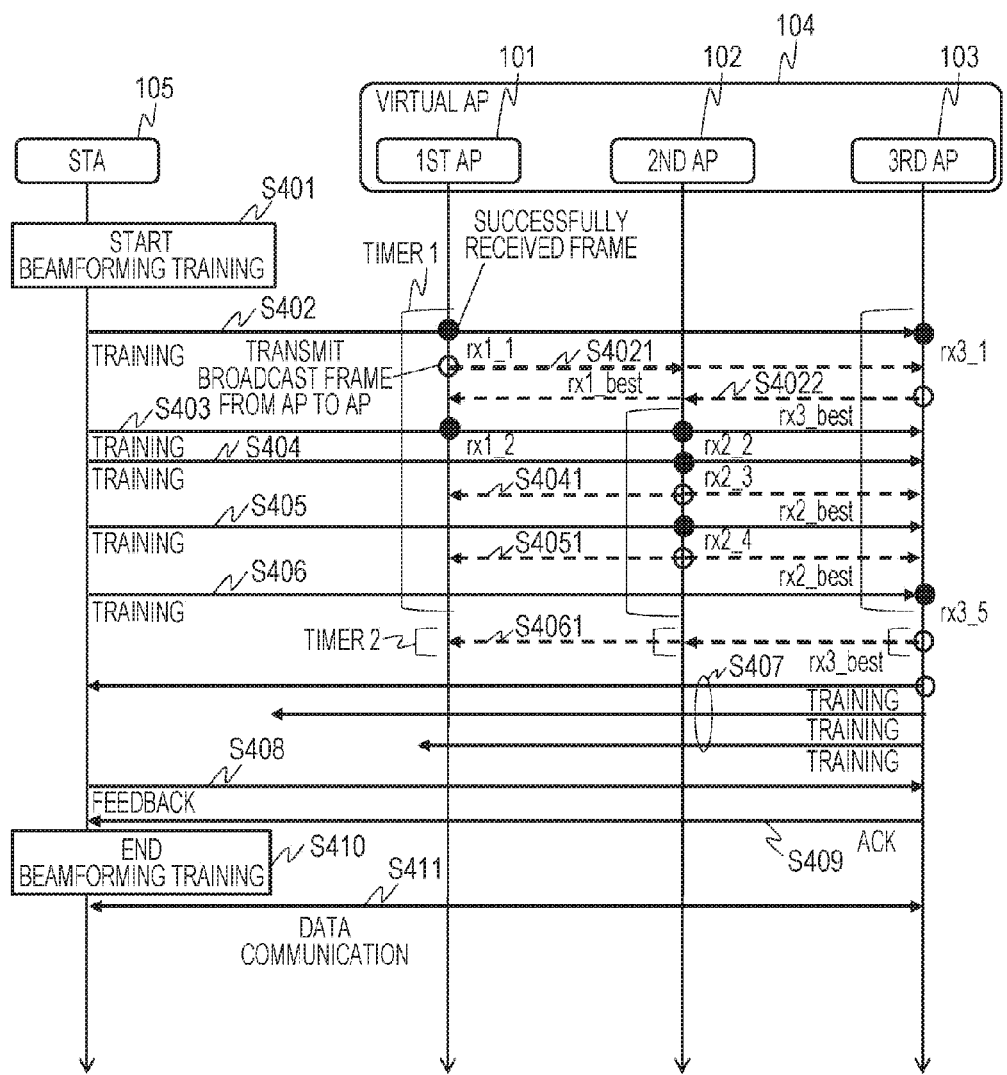

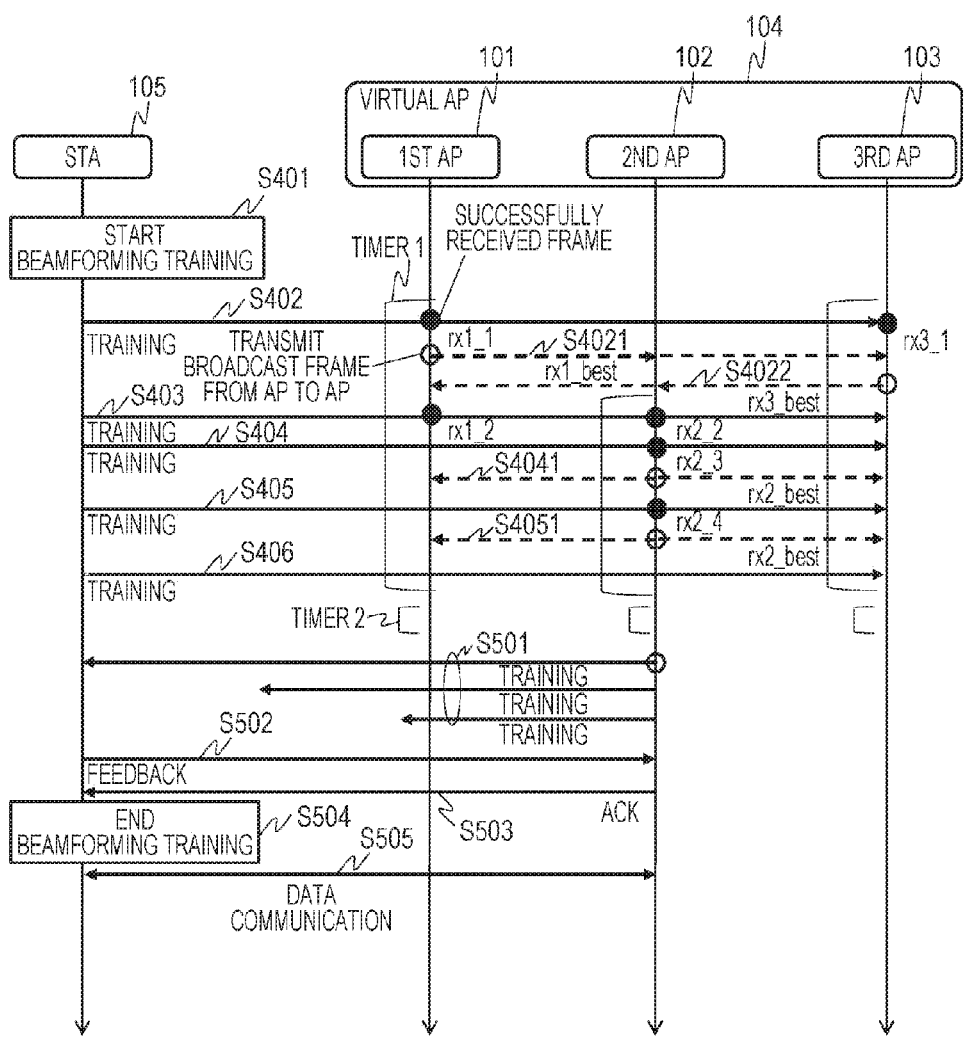

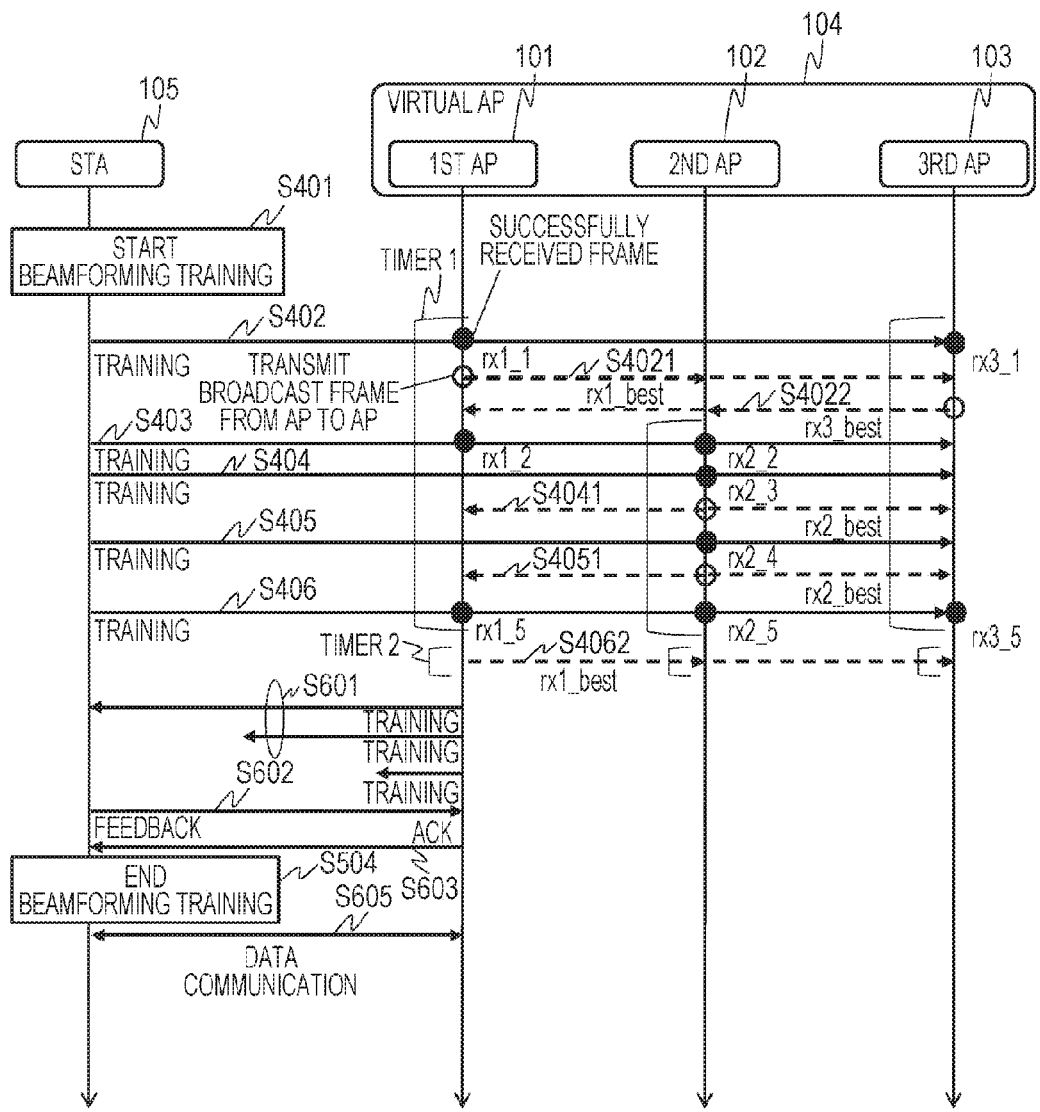

WIRELESS COMMUNICATION SYSTEM, WIRELESS CONTROL METHOD, AND VIRTUAL BASE STATION APPARATUS

BACKGROUND

1. Technical Field

The present disclosure relates to a wireless communication system, a wireless control method, and a virtual base station apparatus for performing millimeter-wave band communication using beamforming.

2. Description of the Related Art

In recent years, to ensure a bandwidth of 1 GHz or higher to meet rapidly increasing traffic demands, studies have been made on the employment of small base station apparatuses that perform communication by using millimeter wave bands. For example, a communication system (also sometimes referred to as a heterogeneous network) is conceived in which a plurality of small base station apparatuses are located within a communication area for a base station apparatus that performs communication by using microwave bands.

With the use of millimeter wave bands, such small base station apparatuses have propagation loss greater than with the use of microwave bands, resulting in it being difficult to extend the arrival range of radio waves.

One of the schemes contributing to at least one of addressing such experience of propagation loss, the increase in communication speed, and the spreading of the cell area is directional control (beamforming) for a base station apparatus and a terminal (also sometimes referred to as a "terminal apparatus" or "station (STA)") by using a plurality of antenna elements (antenna array). In transmission using directional control, a transmitting apparatus (base station apparatus or terminal) directs radio waves to be transmitted toward a communication partner, thereby allowing the radio waves to reach locations farther than those in non-directional transmission. This allows the transmitting apparatus to extend the cell area that is covered. In addition, since directional control enables enhanced signal to interference-plus-noise power ratio (SINR), the application of a modulation scheme and coding rate with high frequency use efficiency allows the transmitting apparatus to perform communication at high transmission speeds (see, for example, Institute of Electrical and Electronics Engineers (IEEE) 802.11ad-2012 Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications Amendment 3: Enhancements for Very High Throughput in the 60 GHz Band).

In a wireless network that uses millimeter wave bands, it is necessary for a base station apparatus to perform beamforming training for directivity matching for each terminal to be connected. The base station apparatus needs to have directivity (scan) over a wider angle to increase the cell area that is covered, and the time required for the beamforming training becomes overhead, resulting in a reduction in frequency use efficiency.

SUMMARY

One non-limiting and exemplary embodiment facilitates providing a wireless communication system, a wireless control method, and a virtual base station apparatus that enable an increase in cell area that is covered by a millimeter-wave network and a reduction in the time required for beamforming training.

In one general aspect, the techniques disclosed here feature a wireless communication system including a virtual base station apparatus including a plurality of base station apparatuses, and a terminal apparatus. Each of the plurality of base station apparatuses of the virtual base station apparatus includes a first receiver that receives a plurality of first training frames transmitted from the terminal apparatus, a communication device, which, in operation, communicates, each time the first receiver receives each of the plurality of first training frames, a reception quality of each of the plurality of first training frames to other base station apparatuses of the plurality of base station apparatuses, and a first transmitter, which, in operation, performs millimeter-wave band communication with the terminal apparatus by using beamforming. The terminal apparatus includes a second transmitter, which, in operation, sequentially transmits the plurality of first training frames to the plurality of base station apparatuses, and a second receiver which, in operation, receives a plurality of second training frames transmitted from the virtual base station apparatus. The plurality of base station apparatuses include a first base station apparatus. The communication device of the first base station apparatus, in operation, communicates a best reception quality out of the reception qualities communicated among the plurality of base station apparatuses within a predetermined period to other base station apparatuses of the plurality of base station apparatuses. The first transmitter of the first base station apparatus, in operation, sequentially transmits the plurality of second training frames to the terminal apparatus.

It should be noted that general or specific embodiments may be implemented as a system, a method, an integrated circuit, a computer program, a storage medium, or any selective combination thereof.

According to an embodiment of the present disclosure, a reduction in the time required for beamforming training in a millimeter-wave network is achievable.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a sequence diagram when the last training frame has been received by a single base station apparatus and when the reception quality is best;

FIG. 8 is a sequence diagram when no base station apparatus has received the last training frame from the terminal apparatus; and FIG. 9 is a sequence diagram when the last training frame from the terminal apparatus has been received by two or more base station apparatuses and one of them is the best base station apparatus.

DETAILED DESCRIPTION

In directional control, when a base station apparatus does not have information which can be used to determine the direction in which a terminal is present after an initial connection has been established, it is difficult for the base station apparatus to transmit a signal with directivity directed in the direction in which the terminal is present.

To address this difficulty, a method for a typical millimeter-wave network has been proposed in which a range that is a cell area is divided into subranges in accordance with the width (angle) of directivity and a base station apparatus sequentially transmits to each of the subranges a signal whose directivity is switched.

Figure 1:
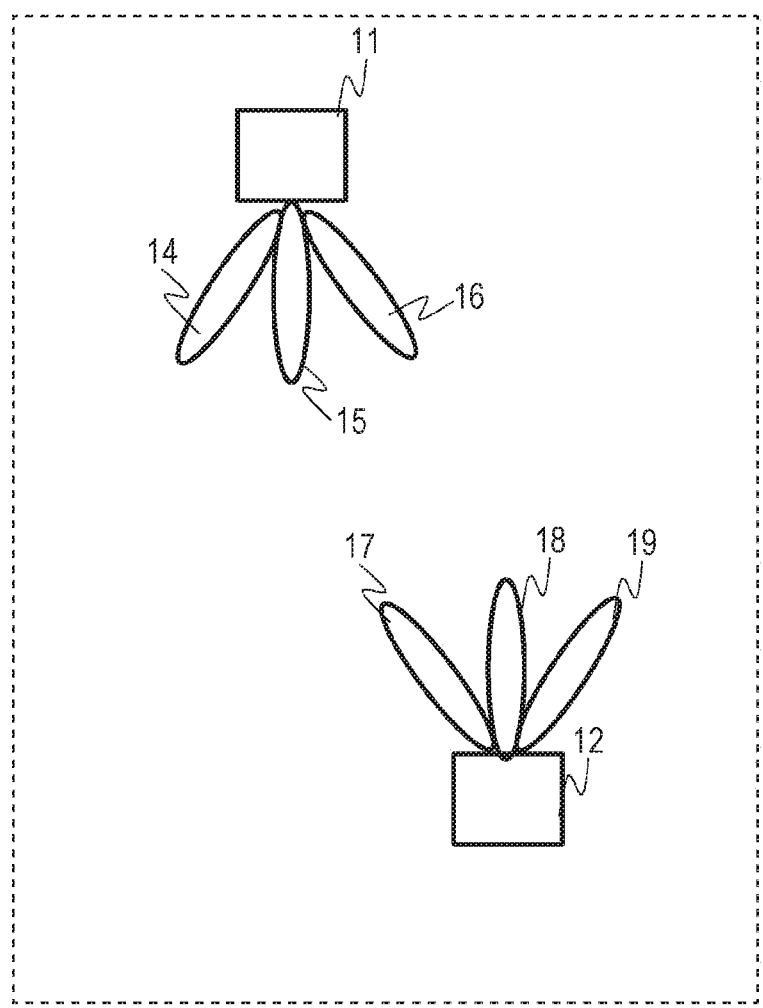
FIG. 1 illustrates an example of a millimeter-wave communication system.

FIG. 1 illustrates an example of a millimeter-wave communication system. In the millimeter-wave communication system illustrated in FIG. 1, a wireless station apparatus (access point (AP)) 11 and a wireless station apparatus (STA) 12 perform communication by using millimeter waves.

Radio wave directivity directions (hereinafter sometimes referred to also as "beams") which are formed by antennas of the wireless station apparatus (AP) 11 are indicated by numerals 14, 15, and 16. The wireless station apparatus (AP) 11 is capable of forming and switching, for example, N beams, where N is an integer greater than or equal to 1.

In FIG. 1, the N beams are each assigned a number (hereinafter sometimes referred to also as a "beam ID"). In FIG. 1, the radio wave directivity direction (beam) 14 is assigned beam ID=1, the radio wave directivity direction (beam) 15 is assigned beam ID=n, and the radio wave directivity direction (beam) 16 is assigned beam ID=N. Likewise, the wireless station apparatus (STA) 12 is also capable of forming and switching K beams, where K is an integer greater than or equal to 1.

In FIG. 1, a radio wave directivity direction (beam) 17 is assigned beam ID=1, a radio wave directivity direction (beam) 18 is assigned beam ID=k, and a radio wave direction (beam) 19 is assigned beam ID=K. A beam pair to produce the best transmission quality between the wireless station apparatus (AP) 11 and the wireless station apparatus (STA) 12 is selected before data communication is started.

The process for selecting the best beam pair between wireless station apparatuses is called beamforming training. An entity that initiates beamforming training is called an initiator, and a responding entity is called a responder. In the following description, in FIG. 1, the wireless station apparatus (AP) 11 is the initiator and the wireless station apparatus (STA) 12 is the responder, for example.

Figure 2:
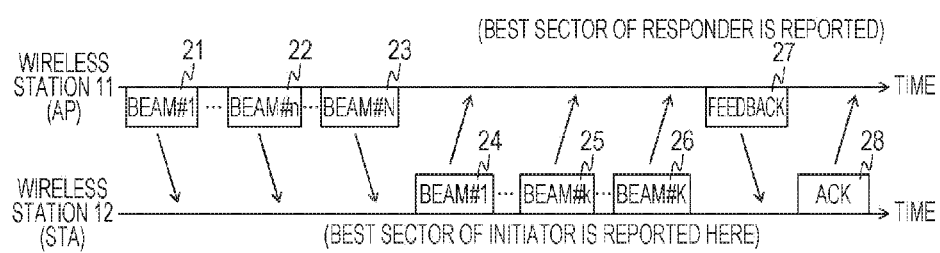
FIG. 2 is a timing chart illustrating an example of beamforming training in the millimeter-wave communication system.

FIG. 2 is a timing chart illustrating an example of beamforming training in the millimeter-wave communication system. In FIG. 2, training frames 21, 22, and 23, which are transmitted from the wireless station apparatus (AP) 11, training frames 24, 25, and 26, which are transmitted from the wireless station apparatus (STA) 12, a feedback frame 27, which is transmitted from the AP 11, and an acknowledge (ACK) frame 28, which is transmitted from the STA 12, are illustrated.

First, the wireless station apparatus (AP) 11 switches beams and transmits the training frames 21, 22, and 23. For example, the wireless station apparatus (AP) 11 transmits the training frame 21 by using beam ID=1 (i.e., the beam 14), the training frame 22 by using beam ID=n (i.e., the beam 15), and the training frame 23 by using beam ID=N (i.e., the beam 16). Each training frame includes information on the beam ID used for the transmission of the training frame and information on the number of remaining frames indicating the number of frames left to be transmitted after the transmission of the training frame.

Upon correct receipt of the training frames 21, 22, and 23 (without error), the wireless station apparatus (STA) 12 stores the reception qualities (such as the receive levels, the signal-to-noise ratios (SNRs), or the signal-to-interference-noise ratios (SINRs)) of the received training frames 21, 22, and 23 and the information stored in the training frames 21, 22, and 23, namely, the information on the beam IDs and the numbers of remaining frames. The information on the numbers of remaining frames which is obtained from the correctly received training frames 21, 22, and 23 allows the wireless station apparatus (STA) 12 to know the period for transmission of the training frames (hereinafter referred to as the "training frame transmission period") from the wireless station apparatus (AP) 11.

After detecting the end of the training frame transmission period, the wireless station apparatus (STA) 12 then performs training of transmit beams for the wireless station apparatus (STA) 12 in a similar way.

The wireless station apparatus (STA) 12 switches beams and transmits the training frames 24, 25, and 26. For example, the wireless station apparatus (STA) 12 transmits the training frame 24 by using beam ID=1 (i.e., the beam 17), the training frame 25 by using beam ID=k (i.e., the beam 18), and the training frame 26 by using beam ID=K (i.e., the beam 19).

Each training frame includes information on the beam ID used for the transmission of the training frame and information on the number of remaining frames indicating the number of frames left to be transmitted after the training frame. In addition, the training frames 24, 25, and 26 also include information for notifying the wireless station apparatus (AP) 11 of a beam ID included in a training frame determined to have been received with the best quality among the training frames 21, 22, and 23 received by the wireless station apparatus (STA) 12 (the beam ID is hereinafter sometimes referred to also as the "best sector of the wireless station apparatus (AP) 11").

Upon correct receipt of the training frames 24, 25, and 26 from the wireless station apparatus (STA) 12 (without error), the wireless station apparatus (AP) 11 stores the reception qualities (such as the receive levels, the SNRs, or the SINRs) of the received training frames 24, 25, and 26 and the information stored in the training frames 24, 25, and 26, namely, the information on the beam IDs and the numbers of remaining frames. Further, the wireless station apparatus (AP) 11 selects a beam ID to provide the best reception quality when transmission is performed from the wireless station apparatus (AP) 11 to the wireless station apparatus (STA) 12, by using the beam ID reported by the wireless station apparatus (STA) 12, which indicates the best sector of the wireless station apparatus (AP) 11, and uses the beam with the selected beam ID for the subsequent communication with the wireless station apparatus (STA) 12.

The information on the numbers of remaining frames which is obtained from the correctly received training frames 24, 25, and 26 allows the wireless station apparatus (AP) 11 to know the training frame transmission period from the wireless station apparatus (STA) 12.

After detecting the end of the training frame transmission period, the wireless station apparatus (AP) 11 reports a beam ID included in a training frame determined to have been received with the best quality among the training frames 24, 25, and 26 received by the wireless station apparatus (AP) 11 (the beam ID is hereinafter sometimes referred to also as the "best sector of the wireless station apparatus (STA) 12") to the wireless station apparatus (STA) 12 by using the feedback frame 27.

A receiver of the wireless station apparatus (STA) 12 receives the feedback frame 27 and selects a beam ID to provide the best reception quality when transmission is performed from the wireless station apparatus (STA) 12 to the wireless station apparatus (AP) 11, by using the reported beam ID which indicates the best sector of the wireless station apparatus (STA) 12, and uses the beam with the selected beam ID for the subsequent communication with the wireless station apparatus (AP) 11.

The wireless station apparatus (STA) 12 reports a response indicating a receipt of the feedback frame 27 to the wireless station apparatus (AP) 11 by using the ACK frame 28. Thus, the beamforming training ends. Either wireless station apparatus may be an initiator.

When the wireless station apparatus (AP) 11 and the wireless station apparatus (STA) 12 form a wireless network such as a wireless local area network (LAN), the wireless station apparatus (AP) 11 operates as a base station apparatus (hereinafter sometimes referred to also as an "access point (AP)") and the wireless station apparatus (STA) 12 operates as a terminal (hereinafter sometimes referred to also as a "station (STA)"), for example. Typically, the AP is located at a fixed location and the STA is moving, e.g., a mobile terminal.

It is desirable that both the base station apparatus (the wireless station apparatus (AP) 11) and the terminal (the wireless station apparatus (STA) 12) direct directivity over a wide angle range (for example, 180° to 360° to support a change in the attitude or orientation of the terminal.

To direct directivity over a wide angle range (allocate the beam over a wide angle range), an antenna array with multiple elements (for example, 16 to 64 elements) is needed. However, an antenna array having a large number of elements increases the circuit scale of a wireless unit, and it is difficult to incorporate an antenna array having a large number of elements in a terminal for which compactness and low power consumption are required.

Thus, the range of the angle of emission of radio waves transmitted from the terminal is narrow, and a change in the attitude or orientation of the terminal also largely changes the communication-available area, which is difficult to support with a single base station apparatus. To address this difficulty, a technology has been proposed for arranging a plurality of base station apparatuses in a distributed manner so as to increase the communication-available area of the base station apparatuses to cover a wide range.

In a case where a plurality of base station apparatuses are arranged in a distributed manner as described above and a terminal as an initiator starts beamforming training, the plurality of base station apparatuses are required to determine, within a short period of time, which base station apparatus returns a response.

Figure 3:
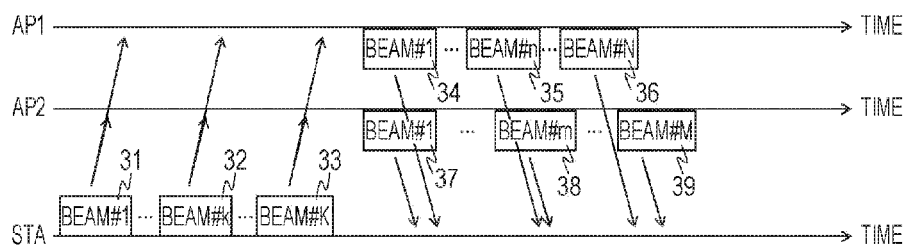
FIG. 3 is a timing chart illustrating an example of beamforming training performed by a terminal apparatus as an initiator.

FIG. 3 is a timing chart illustrating an example of beamforming training performed by a STA as an initiator, that is, by a transmitter of the STA transmitting training frames before APs transmit training frames. In the illustrated example, two APs (e.g., a first AP (AP1) and a second AP (AP2)) are assumed to be located within a communication range with the STA. For example, the first AP uses N beams and the second AP uses M beams.

In FIG. 3, the transmitter of the STA (initiator) transmits training frames 31, 32, and 33. A transmitter of the first AP as a responder transmits training frames 34, 35, and 36, and a transmitter of the second AP as a responder transmits training frames 37, 38, and 39.

The transmitter of the STA switches beams and transmits the training frames 31 to 33. The first AP and the second AP, which are within the communication range with the STA, can each receive at least one of the training frames 31 to 33. Each of the first AP and the second AP determines the best sector of the STA.

After the first AP and the second AP detect the end of the training frame transmission period from the STA, each of the first AP and the second AP performs training of transmit beams by using a method similar to that described above. The transmitter of the first AP switches the N beams and transmits the training frames 34 to 36, and the transmitter of the second AP switches the M beams and transmits the training frames 37 to 39.

Simultaneous transmission of training frames from the transmitters of the first and second APs causes interference between the training frames from the first AP and the training frames from the second AP. Thus, it is difficult for the STA to correctly receive the training frames from the first AP and the training frames from the second AP.

Even if the STA has correctly received the training frames from the first AP and the training frames from the second AP, the plurality of training frames have mixed content of beam IDs for both the first AP and the second AP and best sectors of the STA for both the first AP and the second AP. Such mixed content hinders transmission of correct information. Thus, it is difficult to correctly complete the beamforming training.

Accordingly, the disclosers of the present disclosure have focused on the following issues: in a millimeter-wave network, an increase in the number of base station apparatuses leads to an increase in communication-available area; however, the absence of exclusive control among a plurality of base station apparatuses may cause interference by simultaneous responses returned from the base station apparatuses, which makes it difficult for a terminal to receive the responses or makes it difficult for the plurality of base station apparatuses to report the best sectors of the terminal. The disclosers of the present disclosure also have focused on the fact that simple exclusive control, such as the sequential return of responses from a plurality of base station apparatuses, prolongs the time required for beamforming training.

The disclosers have arrived at the present disclosure as a result of reassessment of the method for beamforming training in order to perform exclusive control among a plurality of base station apparatuses for a short period of time within a communication area formed by a virtual base station apparatus constituted by the plurality of base station apparatuses to increase the communication range of a millimeter-wave network to autonomously select a base station apparatus that is to return a response to the terminal.

An embodiment of the present disclosure will be described in detail hereinafter with reference to the drawings.

2. Embodiment

2-1. Configuration of Communication System

Figure 4:
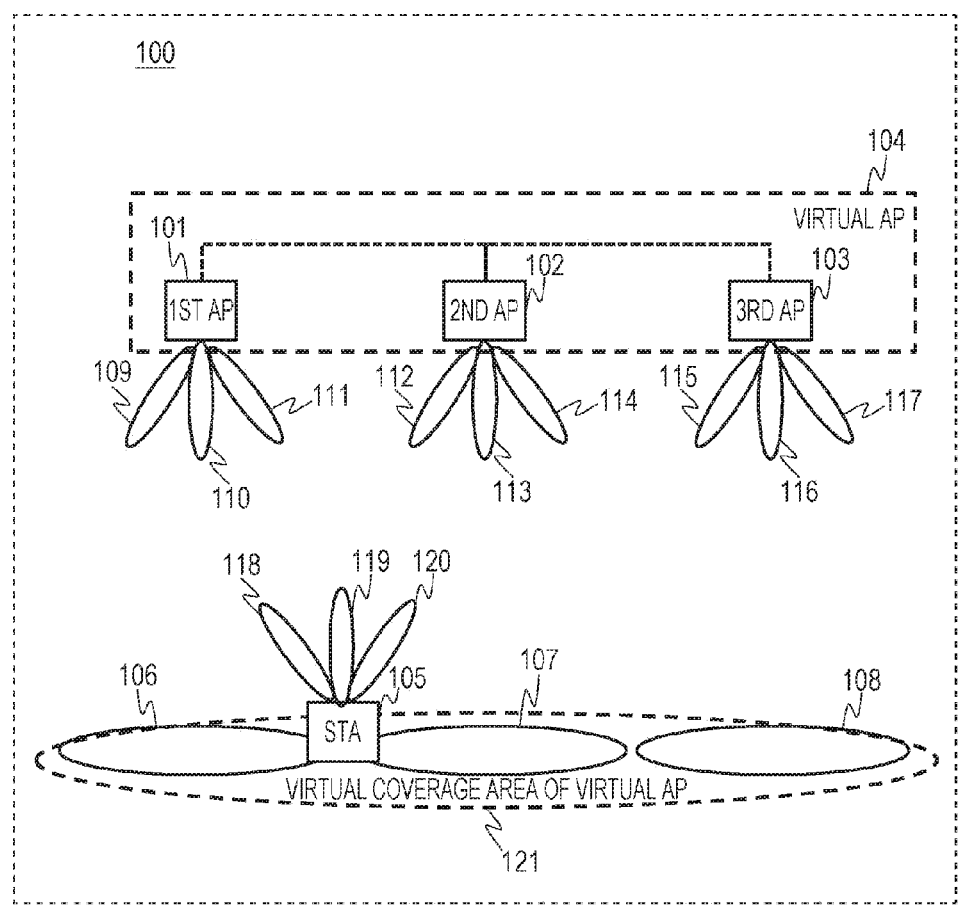
FIG. 4 illustrates an example configuration of a millimeter-wave communication system according to an embodiment.

FIG. 4 illustrates an example configuration of a millimeter-wave communication system 100 according to this embodiment. In the millimeter-wave communication system 100 according to this embodiment, a plurality of APs cooperate with each other to form a virtual AP. Specifically, a base station apparatus 101 (a first AP), a base station apparatus 102 (a second AP), and a base station apparatus 103 (a third AP) are connected to one another via a dedicated line to thereby form a virtual base station apparatus 104 (virtual AP). The first AP primarily covers a communication area 106 by using beams 109 to 111, the second AP primarily covers a communication area 107 by using beams 112 to 114, and the third AP primarily covers a communication area 108 by using beams 115 to 117. The virtual AP 104 is capable of covering a communication area 121, which is a wide range including all of the communication areas 106 to 108. A terminal (STA) 105 establishes a connection with the virtual AP 104 by using beams 118 to 120.

2-2. Beamforming Training

Figure 5:
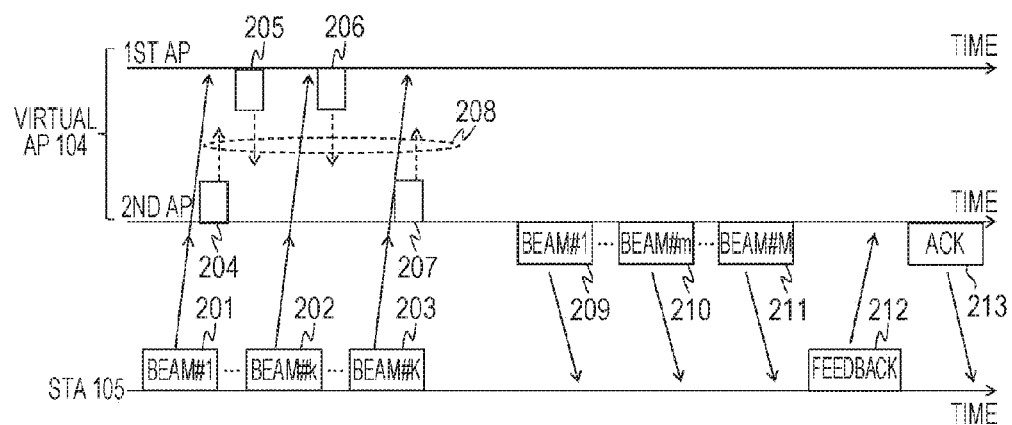
FIG. 5 is a timing chart illustrating an example of beamforming training between a virtual base station apparatus and a terminal apparatus.

FIG. 5 is a timing chart illustrating an example of beamforming training between the virtual AP 104 and the STA 105. In FIG. 5, the third AP of the virtual AP 104 is not illustrated to avoid increased complexity of illustration. In FIG. 5, training frames 201, 202, and 203, which are transmitted from the STA 105, broadcast frames 204, 205, 206, and 207, which are exchanged between the first AP and the second AP (and the third AP (not illustrated)) via a dedicated line 208, training frames 209, 210, and 211, which are transmitted from the virtual AP 104, a feedback frame 212, which is transmitted from the STA 105, and an ACK frame 213, which is transmitted from the virtual AP 104, are illustrated.

A transmitter of the STA 105 switches beams and transmits the training frames 201 to 203.

In the virtual AP 104, the respective receivers of the first and second APs receive training frames from the STA 105. When the respective receivers of the first and second APs correctly receives training frames from the STA 105, the first AP and the second AP each store the reception quality of a received training frame and the information included in the training frame, namely, the information on the beam ID and the number of remaining frames. Furthermore, the virtual AP 104 exchanges the stored information among the APs (communication units of the first to third APs) by using the communication units of the first and second APs.

Upon detection of the end of the training frame transmission period from the STA 105, the virtual AP 104 determines the best sector of the STA 105 between the first AP and the second AP. At this time, the virtual AP 104 also determines which of the first AP and the second AP has a better reception state, and selects an AP that is to return a response to the STA 105. In the example illustrated in FIG. 5, the second AP is selected as an AP that is to return a response to the STA 105. In the foregoing description, a controller (not illustrated) that determines which of the first AP and the second AP has a better reception state and that selects an AP that is to return a response to the STA 105 may be used. In this case, the controller may be a component of the virtual AP 104 or may be separated from the virtual AP 104.

The virtual AP 104 transmits the training frames 209 to 211 from the transmitter of the second AP and report the best sector of the STA 105. The controller described above may be configured to select a base station apparatus (second AP) that has finally reported its reception quality to the other base station apparatus(s) within a predetermined period from among a plurality of base station apparatuses. In this case, the controller instructs the selected base station apparatus (second AP) to report the best sector of the STA 105.

A receiver of the STA 105 receives a training frame from the virtual AP 104 and determines the best sector of the virtual AP 104 on the basis of the received training frame. Upon detection of the end of the training frame transmission period, the transmitter of the STA 105 transmits the feedback frame 212 to the virtual AP 104. The feedback frame 212 includes information on the best sector of the virtual AP 104 (second AP).

Upon receipt of the feedback frame 212, the virtual AP 104 identifies a beam ID to provide the best reception quality when transmission is performed from the virtual AP 104 (second AP) to the STA 105, by using the reported beam ID which indicates the best sector of the virtual AP (second AP), and uses the beam with the identified beam ID for the subsequent communication with the STA 105.

The virtual AP 104 reports a response indicating a receipt of the feedback frame 212 to the STA 105 by using the ACK frame 213. Thus, the beamforming training ends.

The virtual AP 104 and the STA 105 perform subsequent data communication by using the determined beams.

Figure 6:
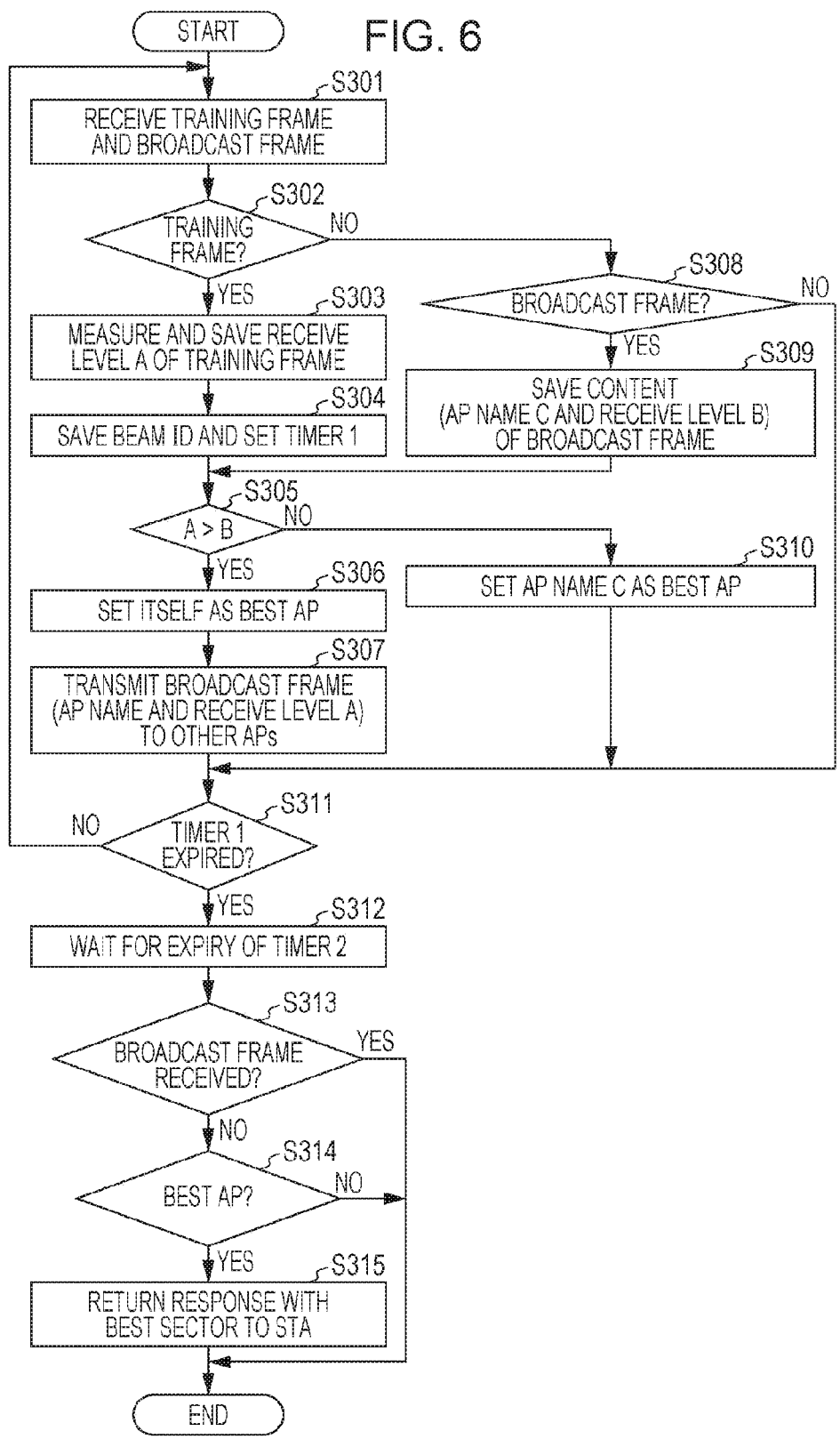
FIG. 6 is a flowchart of a process performed by each base station apparatus for determining the best sector of the terminal apparatus and determining a base station apparatus that is to respond.

FIG. 6 is a flowchart of a process performed by each of the first to third APs for determining the best sector of the STA 105 and determining an AP that is to respond. In FIG. 6, S represents "step".

When beamforming training with the STA 105 is started, each of the first to third APs waits for reception of a training frame from the STA 105 (S301). At this time, each of the first to third APs also waits for a broadcast frame from the other APs. Each of the first to third APs proceeds to S302 upon receipt of a frame or after the lapse of a predetermined time.

Each of the first to third APs determines whether or not the received frame is a training frame (S302). In a case where the received frame is a training frame (YES in S302), each of the first to third APs proceeds to S303 or otherwise proceeds to S308.

In S303, each of the first to third APs measures the receive level of the received training frame. In a case where the measured receive level is higher in terms of reception quality than a receive level A, which is previously saved, each of the first to third APs updates the receive level A with the measured receive level and saves the updated receive level A. The receive level may be measured at, for example, the preamble portion in the first half of the training frame.

In S304, each of the first to third APs demodulates the received training frame and saves the beam ID of the STA 105, which is included in the data portion of the training frame, in association with the updated receive level A saved in S303. Further, each of the first to third APs sets a timer 1 to detect a training frame transmission period on the basis of the number of remaining transmit training frames included in the data portion, and then proceeds to S305.

On the other hand, in a case where the received frame is not a training frame (NO in S302), each of the first to third APs determines whether or not the received frame is a broadcast frame reported via the dedicated line 208 for the APs (the communication units of the first to third APs)

(S308). In a case where the received frame is a broadcast frame, each of the first to third APs proceeds to S309 or otherwise proceeds to S311.

In S309, each of the first to third APs demodulates the broadcast frame and saves the name of the AP that has transmitted the demodulated frame (AP name C) and a receive level B of a training frame received by this AP, which are included in the data portion of the demodulated frame, and then proceeds to S305.

In S305, each of the first to third APs determines which of the saved receive level A and the receive level B is higher (which reception quality is better). In a case where the receive level A is higher than the receive level B, each of the first to third APs determines that the receive level of the training frame received thereby is higher than the receive level of a training frame received by any other AP, and then proceeds to S306. On the other hand, in a case where the receive level B is higher than the receive level A, each of the first to third APs determines that the receive level of the training frame received by the other AP is higher than the receive level of the training frame received thereby, and then proceeds to S310.

In S306, each of the first to third APs sets itself as the AP that is to return a response to the STA 105 (hereinafter sometimes referred to also as the "best AP"), and then proceeds to S307.

In S307, the transmitter of each of the first to third APs transmits a broadcast frame having a data portion that includes information on the name thereof and the receive level A to notify the other APs that the corresponding one of the first to third APs is the best AP. Then, each of the first to third APs proceeds to S311.

In S310, on the other hand, each of the first to third APs sets the other AP rather than itself as the AP that is to return a response to the STA 105 (that is, sets the name of the best AP to the AP name C), and then proceeds to S311.

In S311, each of the first to third APs determines whether or not the timer 1 has expired to determine whether or not the training frame transmission period from the STA 105 has expired. In a case where the timer 1 has not expired, each of the first to third APs returns to S301 and repeats the determinations described above. In a case where the timer 1 has expired, on the other hand, each of the first to third APs proceeds to S312.

In S312, since the training frame transmission period from the STA 105 has expired, each of the first to third APs sets a timer 2 for waiting for transmission of a broadcast frame from any other AP for a predetermined period, and waits for the expiry of the timer 2.

It is desirable that the period set for the timer 2 be short enough to transmit and receive a single broadcast frame. Specifically, it is preferable that the timer 2 be set so that the duration of the timer 2 is greater than or equal to a period for transmitting and receiving a single broadcast frame and is less than a period for transmitting and receiving two broadcast frames since the expiry of the timer 2 is not waited for more than necessary. When the timer 2 expires, each of the first to third APs proceeds to S313.

In S313, each of the first to third APs determines whether or not a broadcast frame has been received for the duration of the timer 2. In a case where a broadcast frame has been received, each of the first to third APs determines that no need exists to return a response therefrom to the STA 105 since any other AP is the best AP, and completes the beamforming training. In a case where no broadcast frame has been received, on the other hand, each of the first to third APs proceeds to S314.

In S314, each of the first to third APs determines whether or not the saved best AP is the corresponding one of the first to third APs. In a case where the best AP is any other AP, each of the first to third APs determines that there is no need to return a response to the STA 105, and completes the beamforming training. Each of the first to third APs proceeds to S315 in a case where the best AP is the corresponding one of the first to third APs.

In S315, the transmitter of each of the first to third APs transmits a training frame with which a response regarding the best sector of the STA 105 is returned to the STA 105, and performs the remaining process of the beamforming training. The best sector of the STA 105 is the beam ID saved in S304 in association with the receive level A.

Next, an example operation of the beamforming training of the millimeter-wave communication system 100 according to this embodiment will be described with reference to FIG. 7, FIG. 8 and FIG. 9.

FIG. 7 is a sequence diagram when the last training frame can be received by a receiver of a single AP and when the reception quality is best.

FIG. 7 is a sequence diagram illustrating an example in which the virtual AP 104 determines an AP that is to respond. In FIG. 7, S represents "step".

The STA 105 starts beamforming training (S401). The transmitter of the STA 105 transmits a plurality of training frames by switching beams (S402 to S406).

In FIG. 7, the training frame initially transmitted in S402 is received by the receivers of the first and third APs. In FIG. 7, a black circle indicates successful reception of a training frame. The reception quality at the first AP is represented by rx1_1 and the reception quality at the third AP is represented by rx3_1. Further, each of the first and third APs sets its timer 1 on the basis of information on the number of remaining transmit frames.

Each of the first and third APs has received a training frame for the first time and thus determines that the best AP is the corresponding one of the first and third APs (S306 in FIG. 6), and transmits a broadcast frame. In FIG. 7, a dotted-line arrow indicates transmission of a broadcast frame via a dedicated line among the APs (among the communication units of the first to third APs), and a white circle indicates the source from which a broadcast frame has been transmitted. The first AP transmits the reception quality rx1_1 of the training frame transmitted in S402 to the other APs by using a broadcast frame (S4021).

The reception quality at the second AP is not higher than the reception quality rx1_1, which is included in the broadcast frame transmitted in S4021 (i.e., the second AP has not successfully received the training frame). Thus, the second AP does not perform broadcasting.

The third AP compares the reception quality rx1_1, which is included in the broadcast frame transmitted in S4021, with the reception quality rx3_1 with which the third AP has received the training frame. In a case where the reception quality rx3_1 is higher than the reception quality rx1_1, the transmitter of the third AP transmits the reception quality rx3_1 to the other APs by using a broadcast frame (S4022). At this point in time, the other APs also identify the third AP as the best AP.

The training frame transmitted in S403 is received by the first AP and the second AP. The reception quality rx1_2 at the first AP is not higher than the reception quality rx3_1 at the best AP, and thus the first AP does not perform broadcasting. The second AP has successfully received the training frame for the first time and then sets its timer 1. The reception quality rx2_2 at the second AP is not higher than the reception quality rx3_1 at the best AP, and thus the second AP does not perform broadcasting. Although the third AP has not successfully received the training frame transmitted in S403, the third AP continues waiting for reception since its timer 1 has not expired.

Likewise, the training frame transmitted in S404 is received by the second AP. The reception quality rx2_3 is higher than the reception quality rx3_1, and thus a broadcast frame is transmitted in S4041. The best AP is changed to the second AP, and the other APs are notified that the reception quality rx2_3 is best. Although the receivers of the first and third APs have not successfully received the training frame transmitted in S404, the receivers of the first and third APs wait for reception since their timers 1 have not expired.

The training frame transmitted in S405 is also received by the receiver of the second AP. The reception quality rx2_4 is higher than the reception quality rx2_3, and thus a broadcast frame is transmitted in S4051. Accordingly, the other APs are notified that the second AP is the best AP and the reception quality rx2_4 is best. Although the receivers of the first and third APs have not successfully received the training frame transmitted in S405, the receivers of the first and third APs continue waiting for reception since their timers 1 have not expired.

The training frame transmitted in S406 is received by the receiver of the third AP. The reception quality rx3_5 is higher than the reception quality rx2_4, and thus a broadcast frame is transmitted in S4061. Accordingly, the other APs are notified that the third AP is the best AP and the reception quality rx3_5 is best.

Here, the timers 1 of the first to third APs expire. Thus, each of the first to third APs sets the timer 2 and waits for reception of a broadcast frame from any other AP for a predetermined time. When the receivers of the first and second APs have not successfully received the training frame transmitted in S406 and their timers 1 have expired, the first and second APs set their timers 2 and wait for reception of a broadcast frame from any other AP for a predetermined time. At this time, since the receivers of the first and second APs receive the broadcast frame transmitted from the third AP in S4061, the first and second APs identify the third AP as the best AP and identify the reception quality rx3_5 as the best reception quality.

When the timers 2 expire, the transmitter of the third AP, which is the best AP, serves as a virtual AP and responds by transmitting training frames including information on the best sector of the STA 105 to the STA 105 (S407).

The receiver of the STA 105 receives the training frames transmitted in S407, determines the best sector of the virtual AP (third AP), and reports the best sector to the virtual AP (third AP) by using a feedback frame (S408).

The virtual AP (third AP) receives the feedback frame, identifies the best sector thereof, and transmits an ACK frame to the STA 105 (S409). Thus, the beamforming training ends (S410).

Subsequent data communication is performed between the STA 105 and the third AP, which is a virtual AP, by using the determined best AP and the best sector (S411).

FIG. 8 is a sequence diagram illustrating an example in which none of the APs has successfully received the last training frame from the STA 105. In FIG. 8, S represents "step" and a process in S401 to S4051, which are represented by the same numerals as those in FIG. 7, is performed in a way similar to that in FIG. 7.

In the example illustrated in FIG. 8, since none of the APs performs broadcasting for the duration of the timer 2, the second AP, which has finally transmitted a broadcast frame (S4051), is the best AP.

In a case where the training frame transmitted in S406 has not successfully been received by the receiver of any AP, the respective timers 1 of the first to third APs have expired and each of the first to third APs sets the timer 2 and waits for reception of a broadcast frame from any other AP for a predetermined time. In FIG. 8, since none of the APs updates the reception quality at the best AP, the timers 2 expire without broadcasting. The best AP at the time when the timers 2 have expired is the second AP, which has transmitted a broadcast frame in S4051.

The second AP, which is the best AP, serves as a virtual AP and responds by transmitting training frames including information on the best sector of the STA 105 to the STA 105 (S501).

The receiver of the STA 105 receives the training frames transmitted in S501, determines the best sector of the virtual AP (second AP), and reports the best sector to the virtual AP (second AP) by using a feedback frame (S502).

The virtual AP (second AP) receives the feedback frame, identifies the best sector thereof, and transmits an ACK frame to the STA 105 (S503). Thus, the beamforming training ends (S504).

Subsequent data communication is performed between the STA 105 and the virtual AP (second AP) by using the best AP and the best sector (S505).

FIG. 9 is a sequence diagram illustrating an example in which the last training frame from the STA 105 has been received by the receivers of two or more APs and one of the APs is the best AP. In FIG. 9, S represents "step" and a process in S401 to S4051, which are represented by the same numerals as those in FIG. 7, is performed in a way similar to that in FIG. 7.

In FIG. 9, a plurality of APs that have received the last training frame with the best quality attempt to perform broadcasting for the duration of the timer 2, and the first AP, which has first performed broadcasting is the best AP.

In a case where the training frame transmitted in S406 has successfully been received by receivers of a plurality of APs and all of the reception qualities are higher than the reception quality (in FIG. 9, rx2_4) at the previous best AP, an AP that has successfully performed broadcasting by the expiry of the timer 2 is determined to be the best AP.

In FIG. 9, since all of the reception qualities rx1_5, rx2_5, and rx3_5 are higher than the reception quality rx2_4 at the previous best AP, all of the first to third APs prepare to perform broadcasting. However, transmission is performed starting from an AP that is earlier granted a transmission right by using access control (such as carrier sense multiple access/collision detection (CSMA/CD) when Ethernet (registered trademark) is used for a dedicated line) for a dedicated line among the APs (among the communication units of the first to third APs). In FIG. 9, in S4062, the first AP has successfully transmitted a broadcast frame. Since the broadcasting has successfully been performed before the expiry of the timer 2, it is determined at this point in time that the first AP is the best AP.

While the reception qualities rx1_5, rx2_5, and rx3_5 are not compared, it is guaranteed that the reception qualities rx1_5, rx2_5, and rx3_5 are higher than the reception quality rx2_4 at the previous best AP. A priority is placed on early completion of the determination of the last best AP within a shorter period of time. Preferably, an AP performs broadcasting when the difference between the reception quality at the best AP and the reception quality at the AP is greater than or equal to a predetermined threshold value.

After the timers 2 have expired, the first AP, which is the best AP, responds by transmitting training frames including information on the best sector of the STA 105 to the STA 105 (S601).

The receiver of the STA 105 receives the training frames transmitted in S601, determines the best sector of the virtual AP (first AP), and reports the best sector to the virtual AP (first AP) by using a feedback frame (S602).

The virtual AP (first AP) receives the feedback frame, identifies the best sector thereof, and transmits an ACK frame to the STA 105 (S603). Thus, the beamforming training ends (S604).

Subsequent data communication is performed between the STA 105 and the virtual AP (first AP) by using the determined best AP and best sector (S605).

Accordingly, according to this embodiment, a base station apparatus that has successfully received a new training frame from a terminal apparatus is configured to report a new reception quality to other base station apparatuses in a case where the new reception quality is higher than the previous reception quality, and selects, as the best base station apparatus, a base station apparatus that has finally reported the reception quality after the training frame transmission period (the timer 1) from the terminal apparatus has been completed and after a predetermined time (the timer 2) has elapsed, and the selected best base station apparatus transmits training frames to the terminal apparatus. This configuration enables a reduction in the time required for exclusive control between base station apparatuses during beamforming training even if a plurality of base station apparatuses are distributed and are operated so as to cover an area from various angles to increase the communication-available area of a base station apparatus. Thus, the use efficiency of a high-directivity millimeter-wave network with a small coverage can be improved, and an increase in system capacity is achievable.

While an embodiment has been described with reference to the drawings, it is to be understood that the present disclosure is not limited to the illustrated examples. It is apparent that a person skilled in the art can arrive at various changes or modifications within the scope of the appended claims, and it is understood that such changes or modifications also fall within the technical scope of the present disclosure. In addition, any combination of elements in the embodiment described above may be used without departing from the gist of the disclosure.

In the embodiment described above, a plurality of base station apparatuses are connected to each other via a dedicated line to allow the plurality of base station apparatuses to cooperate with each other to form a virtual base station apparatus. Alternatively, a control device that collectively controls a plurality of base station apparatuses may be used to allow the plurality of base station apparatuses to cooperate with each other to form a virtual base station apparatus. In essence, it is desirable to configure a virtual base station apparatus so that information can be reported among a plurality of base station apparatuses.

In the embodiment described above, furthermore, three APs form a virtual AP. It is needless to say that more than three APs may form a virtual AP.

In the embodiment described above, the present disclosure is implemented by hardware, by way of example. However, the present disclosure may be implemented by software in cooperation with hardware.

Furthermore, the functional blocks used in the description of the embodiment described above are each typically implemented as a large scale integration (LSI) circuit that is an integrated circuit having an input terminal and an output terminal. The integrated circuit may control the functional blocks used in the description of the embodiment described above and may have an input and an output. The functional blocks may be individually formed as chips, or a single chip may be formed so as to include some or all of them. While the integrated circuit is referred to here as LSI, the integrated circuit may also be referred to as an IC, a system LSI, a super LSI, or an ultra LSI depending on the difference in the degree of integration.

In addition, a technique for forming an integrated circuit is not limited to the LSI and may be implemented by using a dedicated circuit or a general-purpose processor. A field programmable gate array (FPGA) that can be programmed after the manufacture of the LSI or a reconfigurable processor capable of reconfiguring the connections or settings of circuit cells inside the LSI may be used.

Additionally, in a case where a technique for forming an integrated circuit that substitutes the LSI appears with the development of the semiconductor technology or other derivative technologies, it is apparent that the technique may be used for the integration of the functional blocks. One potential approach is the application of biotechnology, for example.

A wireless communication system according to an aspect of the present disclosure includes a virtual base station apparatus including a first base station apparatus and a second base station apparatus; and a terminal apparatus. The first base station apparatus includes a first receiver, which, in operation, receives a plurality of first training frames transmitted from the terminal apparatus, a communication device, which, in operation, calculates a first reception quality of each of the plurality of first training frames each time each of the plurality of first training frames is received, and a first transmitter, which, in operation, performs millimeter-wave band communication with the terminal apparatus by using beamforming. The terminal apparatus includes a second transmitter, which, in operation, sequentially transmits the plurality of first training frames to the virtual base station apparatus, and a second receiver, which, in operation, receives a plurality of second training frames transmitted from the virtual base station apparatus. The first receiver, in operation, receives a second reception quality of each of the plurality of first training frames from the second base station apparatus, the communication device, in operation, communicates the first reception quality within a determined period to the second base station apparatus, in a case where the first reception quality is higher than the second reception quality, and the first transmitter, in operation, sequentially transmits the plurality of second training frames to the terminal apparatus.

In the wireless communication system according to the aspect of the present disclosure, the first base station apparatus in the virtual base station apparatus may include a first timer, which, in operation, counts the number of the plurality of first training frames, and a second timer, which, in operation, measures a waiting time until a broadcast frame is transmitted from the other base station apparatuses after the first timer has expired.

In the wireless communication system according to the aspect of the present disclosure, each of the plurality of first training frames may include information on the number of remaining training frames that are transmitted from the terminal apparatus, and the first timer may count the number of the plurality of first training frames on the basis of the information on the number of remaining training frames.

In the wireless communication system according to the aspect of the present disclosure, furthermore, the waiting time measured by the second timer may be greater than or equal to a period for transmitting and receiving a single broadcast frame and may be less than a period for transmitting and receiving two broadcast frames.

A wireless control method according to an aspect of the present disclosure is the wireless control method for millimeter-wave communication between a virtual base station apparatus and a terminal apparatus by using beamforming, the virtual base station apparatus including a first base station apparatus and a second base station apparatus. The wireless control method includes sequentially transmitting, by the terminal apparatus, a plurality of first training frames to the virtual base station apparatus, receiving, by the first base station apparatus, the plurality of first training frames, calculating, by the first base station apparatus, a first reception quality of each of the plurality of first training frames each time each of the plurality of first training frames is received, receiving, by the first base station apparatus, a second reception quality of each of the plurality of first training frames from the second base station apparatus, communicating, by the first base station apparatus, the first reception quality within a determined period to the second base station apparatus, in a case where the first reception quality is higher than the second reception quality, sequentially transmitting, by the first base station apparatus, a plurality of second training frame to the terminal apparatus, receiving, by the terminal apparatus, the plurality of second training frame transmitted from the base station apparatus.

The wireless control method according to the aspect of the present disclosure may include counting, by the first base station apparatus in the virtual base station apparatus, the number of the plurality of first training frames; and measuring, by the first base station apparatus, a waiting time until a broadcast frame is transmitted from the other base station apparatuses after the first timer has expired.

In the wireless control method according to the aspect of the present disclosure, each of the plurality of first training frames may include information on the number of remaining training frames that are transmitted from the terminal apparatus, and the number of the plurality of first training frames may be counted on the basis of the information on the number of remaining training frames.

In the wireless control method according to the aspect of the present disclosure, furthermore, the waiting time may be greater than or equal to a period for transmitting and receiving a single broadcast frame and may be less than a period for transmitting and receiving two broadcast frames.

A virtual base station apparatus according to an aspect of the present disclosure includes a first base station apparatus and a second base station apparatus. The first base station apparatus includes a first receiver, which in operation, receives a plurality of first training frames transmitted from a terminal apparatus, a communication device, which, in operation, calculates, each time each of the plurality of first training frames is received, a first reception quality of each of the plurality of first training frames, and a first transmitter, which in operation, performs millimeter-wave band communication with the terminal apparatus by using beamforming. The first receiver, in operation, receives a second reception quality of each of the plurality of first training frames from the second base station apparatus. The communication device, in operation, communicates the first reception quality within a determined period to the second base station apparatus, in a case where the first reception quality is higher than the second reception quality. And the first transmitter, in operation, sequentially transmits a plurality of second training frames to the terminal apparatus.

The present disclosure is suitable for use in a wireless communication system that performs millimeter-wave band communication using beamforming.

What is claimed is:

1. A wireless communication system comprising:
a virtual base station apparatus including a first base station apparatus and a second base station apparatus; and
a terminal apparatus,
the first base station apparatus including
a first receiver, which, in operation, receives a plurality of first training frames transmitted from the terminal apparatus,
a communication device, which, in operation, calculates a first reception quality of the plurality of first training frames each time each of the plurality of first training frames is received, and
a first transmitter, which, in operation, performs millimeter-wave band communication with the terminal apparatus by using beamforming,
the terminal apparatus including
a second transmitter, which, in operation, sequentially transmits the plurality of first training frames to the first and second base station apparatuses of the virtual base station apparatus during a first training frame transmission period, and
a second receiver, which, in operation, receives a plurality of second training frames transmitted from the virtual base station apparatus during a second training frame transmission period after the first training frame transmission period, wherein
the first receiver, in operation, receives from the second base station apparatus, a second reception quality of the plurality of first training frames transmitted from the terminal apparatus during the first training frame transmission period,
the communication device, in operation, communicates the first reception quality within a determined period to the second base station apparatus, in a case where the first reception quality is higher than the second reception quality,
and
the first transmitter, in operation, sequentially transmits the plurality of second training frames to the terminal apparatus.

2. The wireless communication system according to claim 1, wherein
the first base station apparatus in the virtual base station apparatus includes
a first timer, which, in operation, counts a number of the plurality of first training frames, and
a second timer, which, in operation, measures a waiting time until a broadcast frame is transmitted from the second base station apparatus after the first timer has expired.

3. The wireless communication system according to claim 2, wherein
each of the plurality of first training frames includes information on the number of remaining training frames that are transmitted from the terminal apparatus, and the first timer counts the number of the plurality of first training frames on the basis of the information on the number of remaining training frames.

4. The wireless communication system according to claim 2, wherein
the waiting time measured by the second timer is greater than or equal to a period for transmitting and receiving a single broadcast frame and is less than a period for transmitting and receiving two broadcast frames.

5. A wireless control method for millimeter-wave communication between a virtual base station apparatus and a terminal apparatus by using beamforming, the virtual base station apparatus including a first base station apparatus and a second base station apparatus, the wireless control method comprising:
sequentially transmitting, by the terminal apparatus, a plurality of first training frames to the first and second base station apparatuses of the virtual base station apparatus during a first training frame transmission period,
receiving, by the first base station apparatus, the plurality of first training frames,
calculating, by the first base station apparatus, a first reception quality of the plurality of first training frames each time each of the plurality of first training frames is received,
receiving, by the first base station apparatus from the second base station apparatus, a second reception quality of the plurality of first training frames transmitted from the terminal apparatus during the first training frame transmission period,
communicating, by the first base station apparatus, the first reception quality within a determined period to the second base station apparatus, in a case where the first reception quality is higher than the second reception quality,
sequentially transmitting, by the first base station apparatus, a plurality of second training frames to the terminal apparatus during a second training frame transmission period after the first training frame transmission period,
receiving, by the terminal apparatus, the plurality of second training frames transmitted from the base station apparatus.

6. The wireless control method according to claim 5, comprising:
counting, by a first timer included in the first base station apparatus in the virtual base station apparatus, a number of the plurality of first training frames; and
measuring, by a second time included in the first base station apparatus, a waiting time until a broadcast frame is transmitted from the second base station apparatus after the first timer has expired.

7. The wireless control method according to claim 6, wherein
each of the plurality of first training frames includes information on the number of remaining training frames that are transmitted from the terminal apparatus, and
the number of the plurality of first training frames is counted on the basis of the information on the number of remaining training frames.

8. The wireless control method according to claim 6, wherein
the waiting time is greater than or equal to a period for transmitting and receiving a single broadcast frame and is less than a period for transmitting and receiving two broadcast frames.

9. A virtual base station apparatus, the virtual base station apparatus including a first base station apparatus and a second base station apparatus, comprising:
the first base station apparatus including
a first receiver, which in operation, receives a plurality of first training frames transmitted from a terminal apparatus during a first training frame transmission period,
a communication device, which, in operation, calculates, each time each of the plurality of first training frames is received, a first reception quality of the plurality of first training frames, and
a first transmitter, which in operation, performs millimeter-wave band communication with the terminal apparatus by using beamforming, wherein
the first receiver, in operation, receives, from the second base station apparatus, a second reception quality of the plurality of first training frames transmitted from the terminal apparatus during the first training frame transmission period,
the communication device, in operation, communicates the first reception quality within a determined period to the second base station apparatus, in a case where the first reception quality is higher than the second reception quality, and
the first transmitter, in operation, sequentially transmits a plurality of second training frames to the terminal apparatus during a second training frame transmission period after the first training frame transmission period.

* * * * *